(12) United States Patent  
Eisinger (10) Patent No.: US 8,874,730 B1  
(45) Date of Patent: *Oct. 28, 2014

(54) NON-MODAL DIALOG FOR MANAGING BLOCKING OF MULTIPLE WEB BROWSER COOKIES

(75) Inventor: Jochen Eisinger, Munich (DE)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,839

(22) Filed: Sep. 26, 2011

Related U.S. Application Data (63) Continuation of application No. 13/116,907, filed on May 26, 2011, now Pat. No. 8,533,347.

(51) Int. Cl.  
*G06F 15/173* (2006.01)  
*G06F 3/00* (2006.01)  
*G06F 17/30* (2006.01)

(52) U.S. Cl.  
CPC .............................. *G06F 17/30861* (2013.01)  
USPC .......................................... 709/224; 715/745

(58) Field of Classification Search  
CPC .............................................. G06F 17/30861  
USPC ........................... 709/224, 225, 232; 715/745  
See application file for complete search history.

(56) References Cited

U.S. PATENT DOCUMENTS

| 7,614,002 B2 | 11/2009 | Goldfeder et al. | |
|---|---|---|---|
| 2002/0156781 A1* | 10/2002 | Cordray et al. | 707/9 |
| 2007/0083813 A1* | 4/2007 | Lui et al. | 715/709 |
| 2009/0089420 A1 | 4/2009 | Caruso et al. | |

OTHER PUBLICATIONS

Sofer, Nir, "IECookiesView v1.74: Cookies viewer for Internet Explorer", 2009, "http://www.nirsoft.net/utils/internet_explorer_cookies_view.html".*

(Continued)

*Primary Examiner* — Brian J Gillis  
(74) *Attorney, Agent, or Firm* — Sterne, Kessler, Goldstein & Fox P.L.L.C.

(57) ABSTRACT

In order to provide a user with control of how persistent information is used in a Web browser to aid in the display of website content in a non-disruptive manner, a system and a method are provided that allow a user to access a non-modal graphical user interface control using a Web browser. The non-modal graphical user interface control allows the user to specify one or more pieces of persistent information that the Web browser associates with the website content. The Web browser then uses the persistent information to aid in displaying the Web content while allowing the user to continue to use the browser.

22 Claims, 7 Drawing Sheets

(56) References Cited

OTHER PUBLICATIONS

Eisinger, Jochen, "Design document: Cookie Prompt replacement", Apr. 22, 2010, The Chromium Projects, "http://www.chromium.org/developers/design-documents/cookie-prompt-replacement".*

Deitel, P.J. and Deitel, H.M, "Internet & World Wide Web—How to Program," Fourth Edition, pp. Select Pages (Cover Page, Publisher Information, Table of Contents (pp. ix-xx), Index (pp. 1338-1373)), 36-37, 432-436, 933-939, 1046-1062, and 1153-1176, Pearson Education, Inc., Upper Saddle River, New Jersey, United States, (2008).

"HTTP Cookie," from *Wikipedia, the free encyclopedia*, Internet Archive Search: *WayBack Machine Beta*, date range Apr. 13, 2004 to Jun. 29, 2011, page last modified on May 13, 2011, 12 pages, accessed on Nov. 9, 2011 at <http://web.archive.org/web/20110514082402/http://en.wikipedia.org/wiki/HTTP_cookie>.

Non-Final Office Action for U.S. Appl. No. 13/116,907, mailed Apr. 1, 2013; 6 pages.

Notice of Allowance for U.S. Appl. No. 13/116,907, mailed Jul. 18, 2013; 8 pages.

\* cited by examiner

NON-MODAL DIALOG FOR MANAGING BLOCKING OF MULTIPLE WEB BROWSER COOKIES

CROSS-REFERENCE TO RELATED APPLICATIONS

This patent application is a continuation application of U.S. patent application Ser. No. 13/116,907 filed May 26, 2011, entitled "Non-Modal Dialog for Managing Blocking of Multiple Web Browser Cookies", which is incorporated herein by reference in its entirety.

BACKGROUND

A Web browser is a piece of software that facilitates access to websites on the World Wide Web (WWW, or Web), which is a set of informational resources hosted on the Internet. While browsers were text-based in the early stages of the Web, most modern browsers present a user with hypertext pages that integrate text, graphics, and other multimedia content. Modem browsers also allow the user to provide input to navigate from webpage to webpage to satisfy their informational needs.

Web browsers traditionally operate based on a client-server model. In the client-server model, a distributed architecture is used where tasks are divided between resource providers, called servers, and service users, called clients. As part of the operation of the Web, often a user will operate a client machine, which uses support functionality that is hosted by a server. Alternatively, both client and server functionality may be distributed over a local area network (LAN) or within a single machine.

Servers often host processing tasks to reduce the computational burden placed on a client. Servers may have greater processing or storage resources than the clients, or multiple servers may collaborate on processing tasks. However, even if a server is able to take responsibility for certain processing tasks, certain parts of the interaction between clients and servers may require client-side capability. For example, in running a scripting language such as JavaScript, commands are embedded in the Hypertext Markup Language (HTML) files that the server transmits to the client. However, once the scripting commands have been transmitted to the client environment, the Web browser executes the JavaScript commands locally within the Web browser at the client, without demanding further resources from the server.

Another type of interaction within the client-server model is the storage of persistent information by the client, also referred to as client-side storage. An example of persistent information that might be stored by a client is the type of information known as a "cookie", also referred to as a Web cookie, a browser cookie, or an HTTP cookie.

Cookies are textual information stored on the user's computer by the Web browser. They allow Web browsers to perform tasks where locally storing information is necessary, such as authentication, storing preferences, e-commerce, session management, or any other function that storing persistent information can accomplish. Cookies may include name-value pairs, and encryption of cookies is possible if security is necessary. Cookies are transmitted from the server using HTTP (Hypertext Transfer Protocol) to the Web browser as part of header material.

Cookies may expire, or users may take action to intervene and manage cookies by deleting unwanted cookies. Cookies pose a danger, however, in that they preserve a record of information that the user may prefer to keep as private, and as such may be used as spyware. For example, websites that read cookies may glean information about user identification, preferences and activity.

Cookies are not executable, and therefore cannot take destructive action on their own. However, the fact that they expose information that some users may wish to hide presents a dilemma for users. Some websites may absolutely require the use of cookies in order to function properly. For example, an online merchant may use cookies to track a user's shopping cart, and if cookies are not operational, the e-commerce process may break down. Therefore, users may need assistance in managing access to persistent information such as cookies in Web browsers in a convenient, facilitated manner.

BRIEF SUMMARY

Embodiments relate to managing the use of persistent information while providing access to webpages by a Web browser in a manner that minimizes interference with the Web browsing experience. According to an embodiment, a system for managing persistent information in a Web browser is provided. The system includes a Web browser that is configured to receive website content via a network connection and is configured to display the website content as one or more websites in one or more viewing areas, without loading all persistent information associated with the websites. The system also includes a non-modal graphical user interface control, activated using the Web browser, that is configured to display a set of one or more persistent information items available via the network connection that, when associated with at least one of the one or more websites, aid in the displaying of the at least one website. The system further includes an input module that is configured to receive from a user, via the non-modal graphical user interface control, a selection of one or more pieces of the persistent information to retrieve via the network connection. The system also includes a retrieving module that is configured to retrieve the selected one or more pieces of persistent information via the network connection to the Web browser. The system further includes a redisplaying module that is configured to associate the selected one or more pieces of persistent information in the Web browser with the at least one website and is configured to use the selected associated one or more pieces of persistent information to display the at least one website again.

According to another embodiment, a computer-implemented method manages persistent information in a Web browser. In the exemplary method, website content is received by a Web browser via a network connection and displayed as one or more websites in one or more viewing areas, without all persistent information associated with the websites being loaded. Using the Web browser, a non-modal graphical user interface control is activated that displays a set of one or more persistent information items available via the network connection that, when associated with at least one of the one or more websites, aid in the displaying of the at least one website. A selection of one or more pieces of the persistent information from the available persistent information is received from a user, via the non-modal graphical user interface control. The selected one or more pieces of persistent information in the Web browser are associated with the at least one website. The selected associated one or more pieces of persistent information are then used to display the at least one website again.

According to another embodiment, a computer-readable medium has computer-executable instructions stored thereon that, when executed by a processor, cause the processor to manage persistent information in a browser by executing the method described above.

Further embodiments, features, and advantages of the invention, as well as the structure and operation of the various embodiments of the invention are described in detail below with reference to accompanying drawings

BRIEF DESCRIPTION OF THE FIGURES

The accompanying drawings, which are incorporated herein and form a part of the specification, illustrate the subject of the present application and, together with the description, further serve to explain the principles of the subject of the present application and to enable a person skilled in the pertinent art to make and use the subject of the present application.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Each of the constituent parts of a system embodiment may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Each of the constituent parts of a system embodiment may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

It should be noted that computer-readable medium embodiments may include any physical medium which is capable of encoding instructions that may subsequently by used by a processor to implement methods described herein. Example physical media may include floppy discs, optical discs (e.g. CDs, mini-CDs, DVDs, HD-DVD, Blu-ray), hard drives, punch cards, tape drives, flash memory, memory chips. However, any other type of tangible, persistent storage that can serve in the role of providing instructions to a processor may be used to store the instructions in these embodiments.

OVERVIEW

Often setting cookies, since it is done at the client, is largely handled by client-side scripting languages such as JavaScript. In a traditional approach, the layout engine of a Web browser transforms HTML from raw markup language into an interactive webpage that the user may access using the graphical user interface (GUI) functionality of the browser. As part of the transformative process, the layout engine provides the chance for client-side multimedia functionality through plugins such as ADOBE FLASH, as well as client-side scripting such as JavaScript. However, when loading a webpage that may involve cookies, the Web browser must decide what approach to take with respect to how it handles loading cookies and other persistent information as part of the process of loading the webpage.

One approach is to provide an "all-or-nothing" approach, wherein the user simply provides a generalized setting in advance such that all cookies are either allowed or disallowed. However, as previously noted, this is an imperfect solution because this approach simply provides a choice between a security risk and a lack of functionality.

Another alternative is to allow cookies, and then allow the user to subsequently delete them. This allows the user to save space subsequently, but the dangers of cookies, such as cookies acting as spyware, still remain.

Another approach is to provide a modal dialog to the user as webpages are loaded. A dialog box is a type of graphical user interface control that provides a window to the user. The dialog box presents information to the user, and receives input from the user in return. Dialog boxes may be divided into the categories of "modal" and "non-modal" (or "modeless"). The distinction between these two types of dialog box is the way in which their functioning coordinates with the program that generates them.

With a modal dialog box, some specific interaction between the user and the dialog box must occur before the user can continue interacting with the program that activates the modal dialog. An example of a modal dialog is an alert, which displays a piece of information, and it is considered crucial that there be an acknowledgement before the user can continue. For example, if a document is being closed, an alert box may need to ascertain whether or not to save the document. In this case, it would be inappropriate to continue interacting with the application until this question is answered.

However, a non-modal dialog box is appropriate when the information provided by the dialog box is not crucial for the calling application to proceed properly, but interaction with the calling application is desirable. For example, a dialog box that provides access to a spell-checker may be presented as a non-modal dialog, because it may be helpful to allow the user to edit the document even as the spell-check continues.

At present, access to cookies by webpages has been provided by modal dialogs that activate as the webpages are loaded. For example, versions of the GOOGLE CHROME Web browser have used JavaScript code to set cookies such as:

document.cookie="A=B";
console.log(document.cookie);

However, such code requires that JavaScript execution be blocked until the user decides whether to allow the cookie to be set or not. Since WEBKIT, the layout engine of the GOOGLE CHROME Web browser, assumes that it always can execute JavaScript, blocking JavaScript amounts to blocking the rendering process. If the renderer is shared between multiple tabs and/or windows, the prompt may be application modal, and at least block accessing other parts of the Web browser. These modal dialogs allow the user to choose, before a webpage is loaded, whether to allow or disallow cookies or other persistent information associated with the webpage. Alternatively, the dialog may allow more fine-tuned control of the cookies or other persistent information.

However, the drawback of this dialog-based approach is that because the dialog that provides access to the cookies is modal, the user must make his or her decision about whether to load cookies in advance of loading the webpage, and the user cannot continue browsing in any of the other windows or tabs of the browser until he or she has addressed the issue of cookies or other persistent information.

Figure 1:
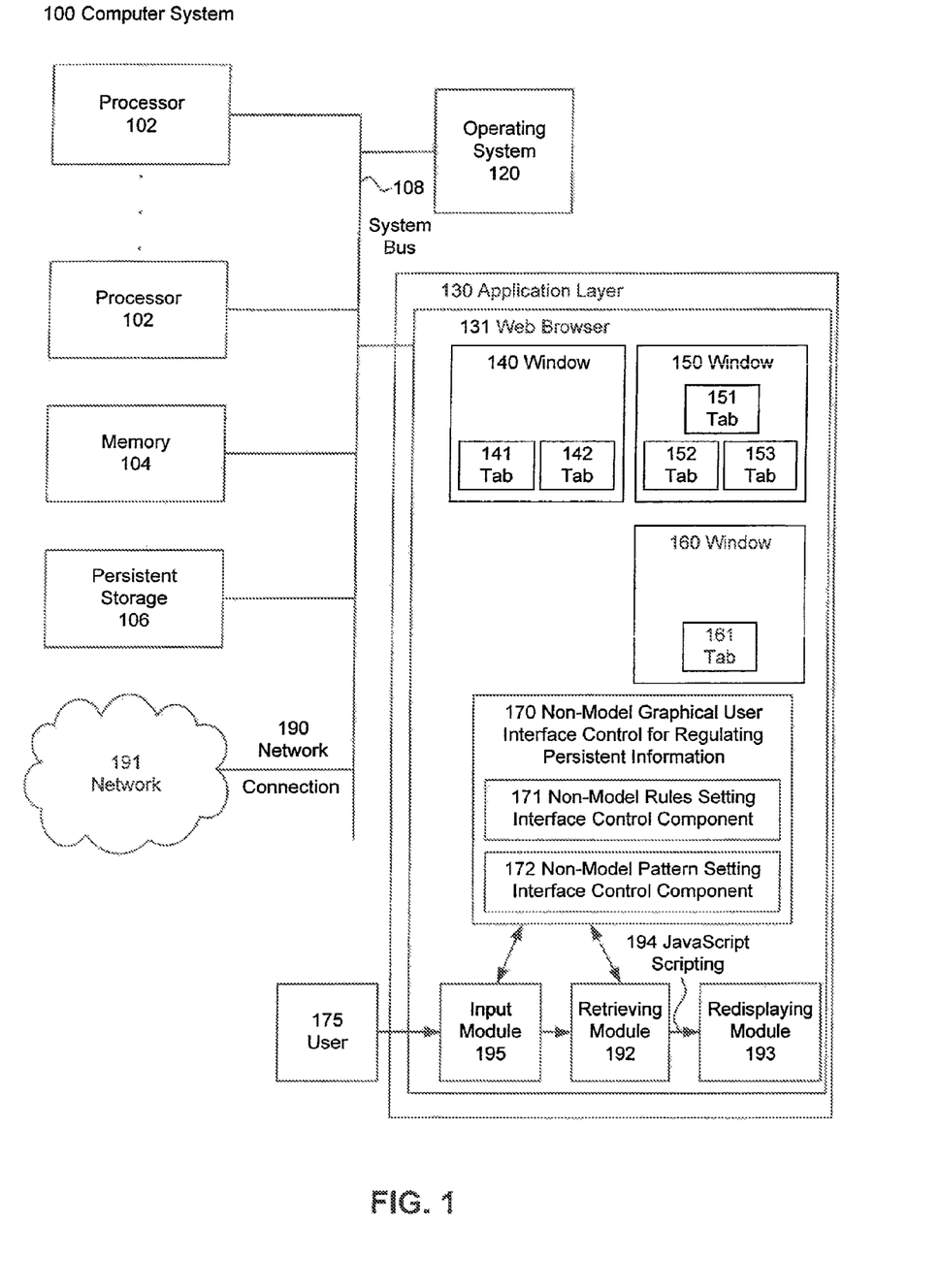
FIG. 1 is a diagram illustrating a client system that manages persistent information in a Web browser, according to an embodiment.

The diagram of FIG. 1 illustrates a computing device 100 that contains a combination of hardware, software, and firmware constituent parts that allow it to run Web browser 131 in an application layer 130 with access to the Web over a network 191. Computing device 100 may be a conventional computer such as a desktop or laptop PC, but it may additionally be any Web-enabled peripheral such as a game console, a tablet, a netbook or a smartphone. Computing device 100 as shown in FIG. 1 may be organized around a system bus 108, but any type of infrastructure that allows the hardware infrastructure elements of computing device 100 to communicate with and interact with each other may be used to function as this part of computing device 100.

The processing task in the embodiment of FIG. 1 is carried out by one or more processors 102, but it should be noted that any type of processing technology may be used here, including multi-core processors, multiple processors, or distributed processors. Additional specialized processing resources such as graphics, multimedia, or mathematical processing capabilities, either in hardware or in software, may also be used as adjuncts or replacements for processors 102 for certain processing tasks.

In order to manipulate data to act as an embodiment, processors 102 access a memory 104 via system bus 108. For data which needs to be stored more permanently, the processor accesses persistent storage 106. Processors 102, memory 104 and persistent storage 106 operate in coordination with operating system 120 to provide basic functionality for computing device 100. Operating system 120 provides support functionality for a layer of applications 130. In the context of the applications 130, computing device 100 executes a Web browser 131.

Web browser 131 may include a variety of viewing areas, which generally include windows and tabs, that provide graphical renditions of HTML Web pages and associated multimedia. In FIG. 1, exemplary viewing areas have been provided as Window 140, including Tab 141 and Tab 142, Window 150, including Tab 151, Tab 152, and Tab 153, and Window 160 including Tab 161. These viewing areas represent display areas in which each website is displayed by Web browser 131.

Computing device 100 may use network connection 190 to communicate with other processing machines via network 191. Network connection 190 may be a wired connection such as Ethernet, token ring, or optical, DSL, cable, or phone connections in conjunction with an appropriate modem. Similarly, appropriate wireless technology may be used to act as network connection 190 to access a network 191. Network 191 may be the Internet, a local area network, or any other network 191 of machines with which computing device 100 may exchange data.

As another piece, the computer system 100 includes in application layer 130, activated by Web browser 131, a non-modal graphical user interface control 170 for regulating persistent information. This non-modal graphical user interface control 170 for regulating persistent information further provides access to a non-modal rules setting interface control component 171 and a non-modal pattern setting interface control component 172 that together allow a user 175 to regulate how persistent information is used. Example screenshots of these three components are provided in FIG. 5, FIG. 6, and FIG. 7.

The Web browser 131 receives input from a user 175 via an input module 195. The input module 195, based on directions given by user 175, directs a retrieving module 192 to retrieve Web pages after the user 175 has associated persistent content with them. Such an association may be made by JavaScript or other scripting commands 194. The Web pages may be redisplayed by a redisplaying module 193.

Figure 2:
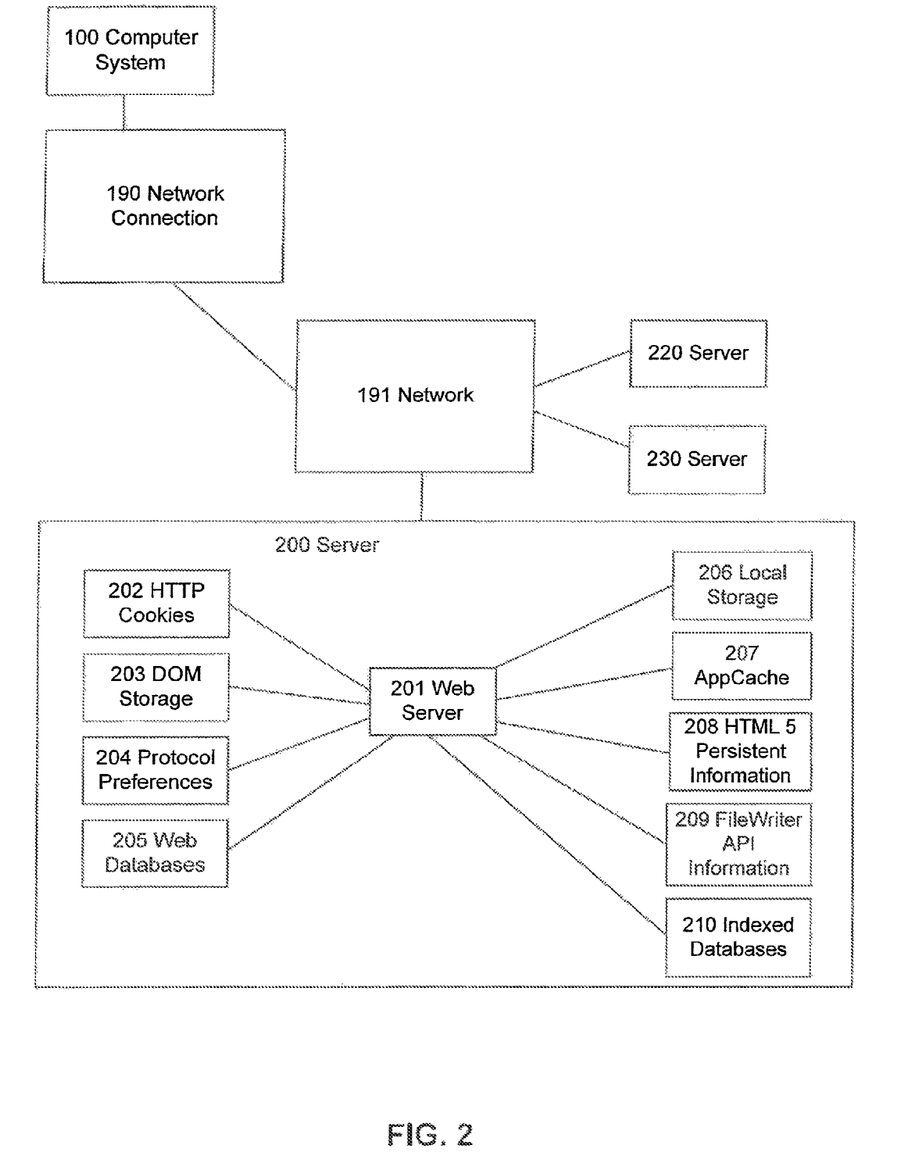
FIG. 2 is a diagram of a client system that retrieves persistent information for a Web browser in a networked environment, according to an embodiment.

FIG. 2 is a diagram of a client system that retrieves persistent information for a Web browser in a networked environment, according to an embodiment. The computer system 100, network connection 190, and network 191 have been discussed in relation to FIG. 1. As noted, computer system 100 may serve as a client machine, and the network 191 may be the Internet. In one embodiment, the functionality of the embodiment is distributed such that the computer system 100 uses the Web browser 131 to access one or more servers, such as server 200, server 220, and server 230, in conjunction with a client-server relationship. This configuration is not meant to exclude the possibility of embodiments that operate in conjunction with other network architectures such as peer-to-peer arrangements, which may be used in other embodiments.

An expanded view of server 200 is provided in FIG. 2. Server 200 executes a Web server 201, which is based on an appropriate combination of one or more of software, hardware, and firmware, and provides access to one or more websites via the network 191. Computer system 100 receives the websites via network connection 190.

The Web server 201 provides access to a variety of types of persistent information that the computer system may request in association with the Web pages. The persistent information is loaded by the client computer system 100, stored locally in memory 104 temporarily, and possibly in persistent storage 106 on a more permanent basis. These types of persistent information may include, but are not limited to: HTTP cookies 202, Document Object Model (DOM) storage 203, protocol preferences 204, Web databases 205, local storage 206, AppCache 207, HTML 5 persistent information 208, File-Writer API information 209, and indexed databases 210.

The common factor which these types of information share is that these types of information originate at the Web server 201 as responses to the user's use of the Web browser 131. These types of information are then transmitted back to be stored at the computer system 100 to be used there in displaying Web pages in viewing areas. For example, viewing areas may include window 140, window 150, and window 160 as well as their constituent tabs tab 141, tab 142, tab 151, tab 152, tab 153, and tab 161. It should be noted that embodiments may control information flow for any type of information such as the information listed above that originates at the Web server 201 and subsequently resides at the computer system 100 to be used in conjunction with displaying the Web sites in the viewing areas.

Figure 3:
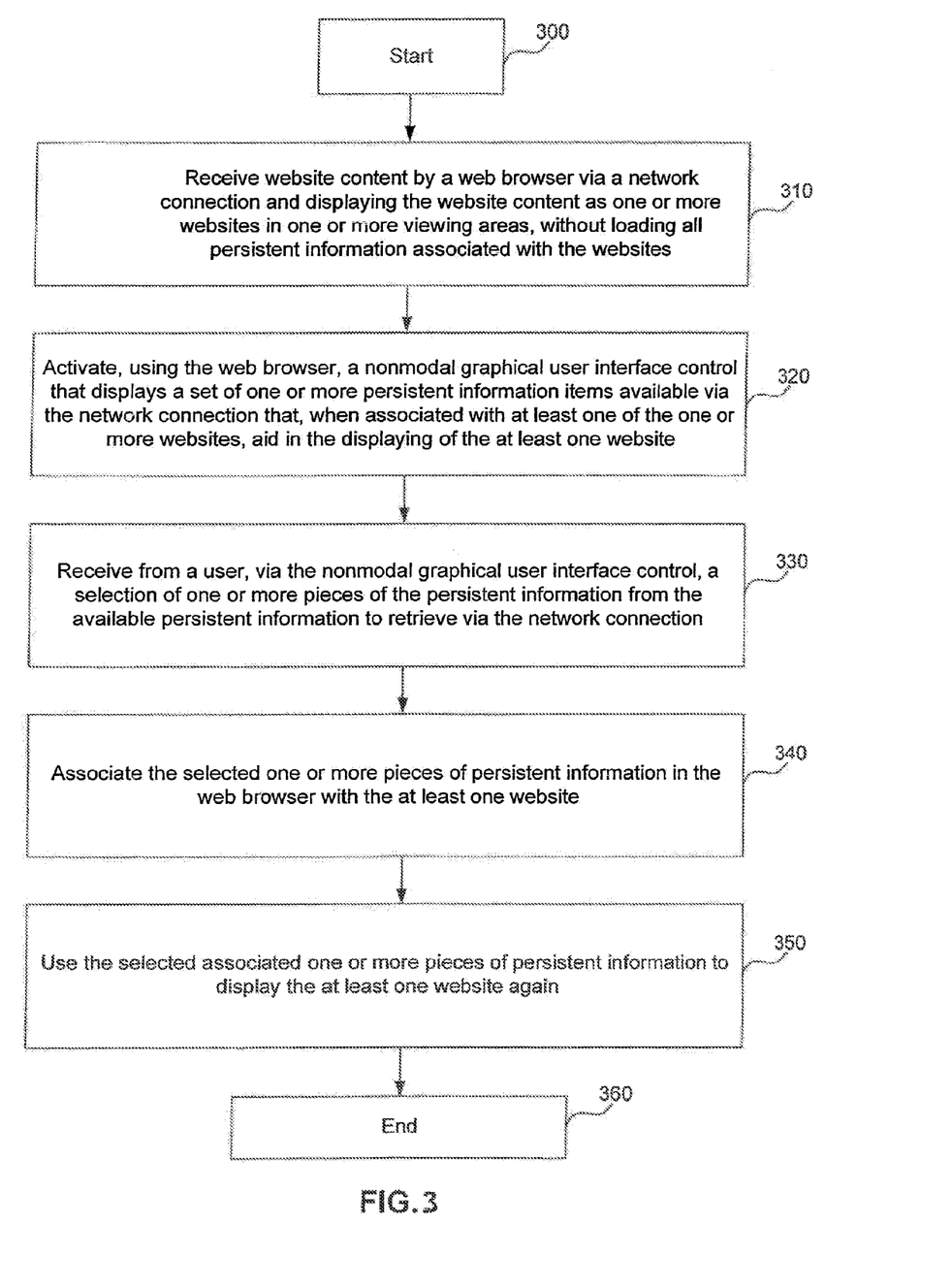
FIG. 3 is a flowchart of a method for managing persistent information, according to an embodiment.

FIG. 3 is a flowchart of a method of managing the persistent information, according to an embodiment. The method begins at stage 300. In stage 310, website content is received by a Web browser via a network connection and displayed as one or more websites in one or more viewing areas, without loading all persistent information associated with the websites. Stage 310 may be performed, for example, by Web browser 131 of FIG. 1, in conjunction with network connection 190 and network 191 of FIG. 1-2. In stage 320, a non-modal graphical user interface control that displays a set of one or more persistent information items available via the network connection is activated by the Web browser. The persistent information items are items that, when associated with at least one of the one or more websites, aid in the displaying of the at least one website. Stage 320 may be performed, for example, by non-modal graphical user interface control 170. Stage 330 includes receiving from a user, via the non-modal graphical user interface control, a selection of one or more pieces of the persistent information from the available persistent information to retrieve via the network connection. Stage 330 may be performed, for example, by non-modal graphical user interface control 170, in conjunction with at least one of non-modal rules setting interface control component 171 and non-modal pattern setting interface control component 172. In stage 340, the selected one or more pieces of persistent information in the Web browser is associated with the at least one website. The association of stage 340 may be performed, for example, by retrieving module 192, that activates JavaScript scripting 194 to cause the association. In stage 350, the selected associated one or more pieces of persistent information are used to display the at least one website again. This redisplaying of stage 350 may be performed, for example by redisplaying module 193. Stage 360 concludes the method.

In the exemplary method of FIG. 3, websites are loaded with at most a subset of the available persistent information (see stage 310) and only subsequently involve other pieces of available persistent information as selected by the user (see stages 320-350). In this manner, the persistent information is used as part of the redisplaying process carried out by the redisplaying module.

Figure 4:
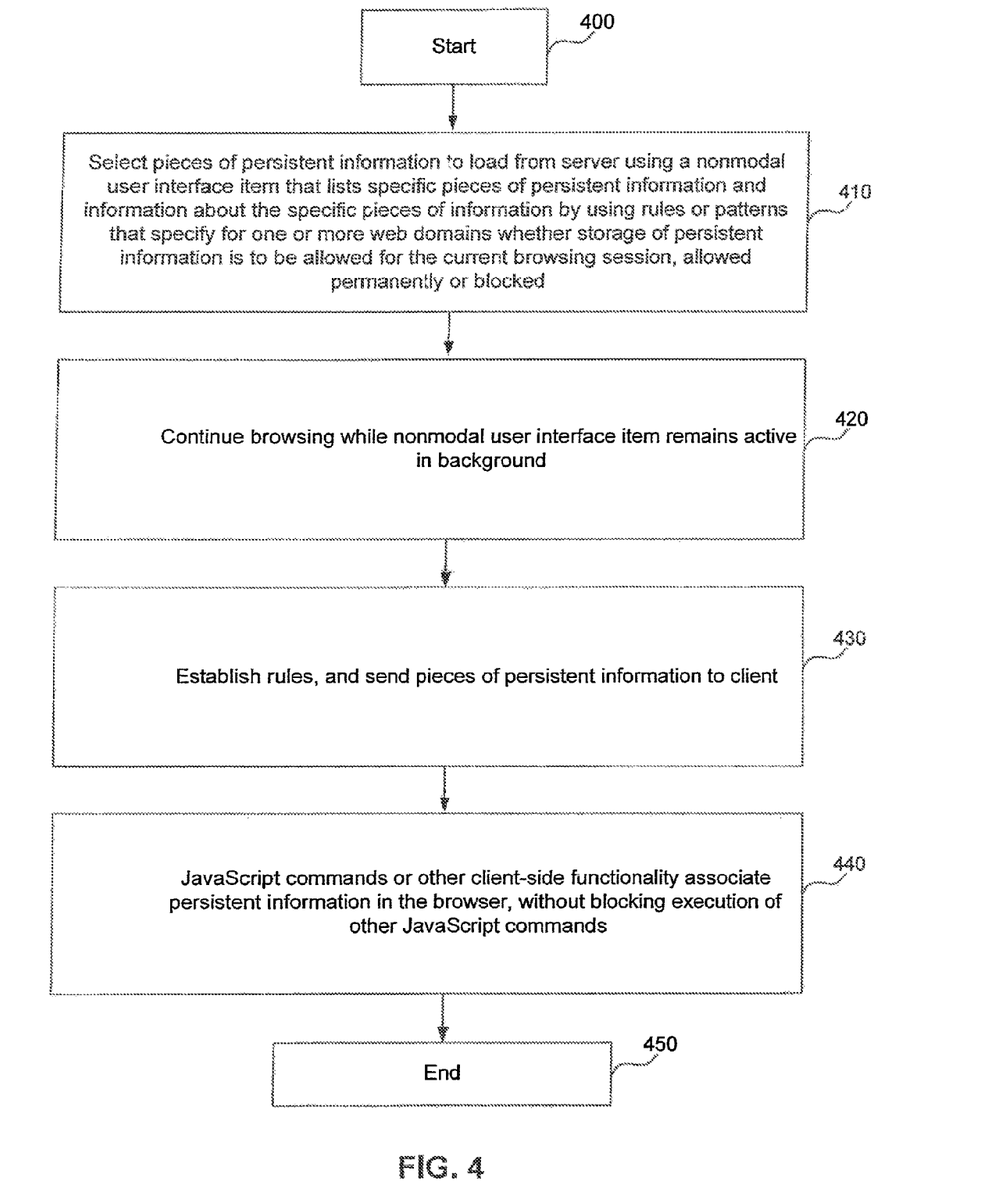
FIG. 4 is another flowchart of a method for managing persistent information, according to an embodiment.

FIG. 4 is another flowchart of a method for managing persistent information, according to an embodiment. The method begins at stage 400. In stage 410, a selection of pieces of persistent information to load from the server is received from a client using a non-modal graphical user interface control for regulating persistent information. The non-modal graphical user interface control for regulating persistent information lists specific pieces of persistent information and information about the specific pieces of information by using one of two control components. For example, the non-modal rules setting interface control component, such as component 171, may specify rules that specify for one or more Web domains whether storage of persistent information is to be allowed for a current browsing session, allowed permanently, or blocked. A non-modal patterns setting interface control component, such as component 172 may specify for patterns of one or more Web domains whether storage of persistent information is to be allowed for the current browsing session, allowed permanently, or blocked.

In an embodiment, the non-modal user interface item (which may be a dialog box, though other non-modal GUI items may be used appropriately as well) provides user 175 with access to different types of persistent information associated with the webpages. In stage 410, for example, user 175 can choose to allow the persistent information to be loaded for the current browsing session, to allow the information permanently, or to block the information.

Thus, in stage 410, a user may gain access to a variety of settings. For example, user 175 might gain access to a set of HTTP cookies 202, protocol preferences 204, and AppCache 207, and choose to load all of the HTTP cookies 202 permanently, load some of the protocol preferences 204 for the current session, and block the AppCache 207.

Stage 420 interrelates the user's interaction with the non-modal graphical user interface control for regulating persistent information with the Web browser. In stage 420, the client may continue browsing while the non-modal graphical user interface control for regulating persistent information remains active in the background. This approach is different than the customary approach, which uses a modal user interface item to regulate persistent information, obtrusively interfering with the user's browsing experience. Stage 420 may be performed, for example, by retrieving module 192 and redisplaying module 193, which may cooperate to associate the persistent information with the viewing areas window 140, window 150, and window 160 and their associated tabs in the background, as browsing continues at Web browser 131.

In stage 430, when the client is finished establishing the rules or patterns (using the non-modal rules setting interface control component or non-modal rules setting patterns control component), the server sends the pieces of persistent information to the client. Stage 430 may be performed, for example, by non-modal rules setting interface control component 171 or non-modal pattern setting interface control component 172 to determine which persistent information to retrieve. Stage 430 may further include the operation of retrieving module 192 that receives the information, and redisplaying module 193 that then redisplays the Web pages in the viewing areas.

Stage 440 details the operation of the JavaScript or other scripting operations. In stage 440, JavaScript commands or other client-side functionality associate persistent information in the browser, without blocking execution of other JavaScript commands. Stage 440 may be performed, for example, between retrieving module 192 and redisplaying module 193. JavaScript associating 194 operates such that the retrieving module 192 retrieves information, associates it with the Web pages, and the redisplaying module displays the Web pages with the aid of the associated information.

Stage 450 concludes the method.

EXAMPLES

Figure 5:
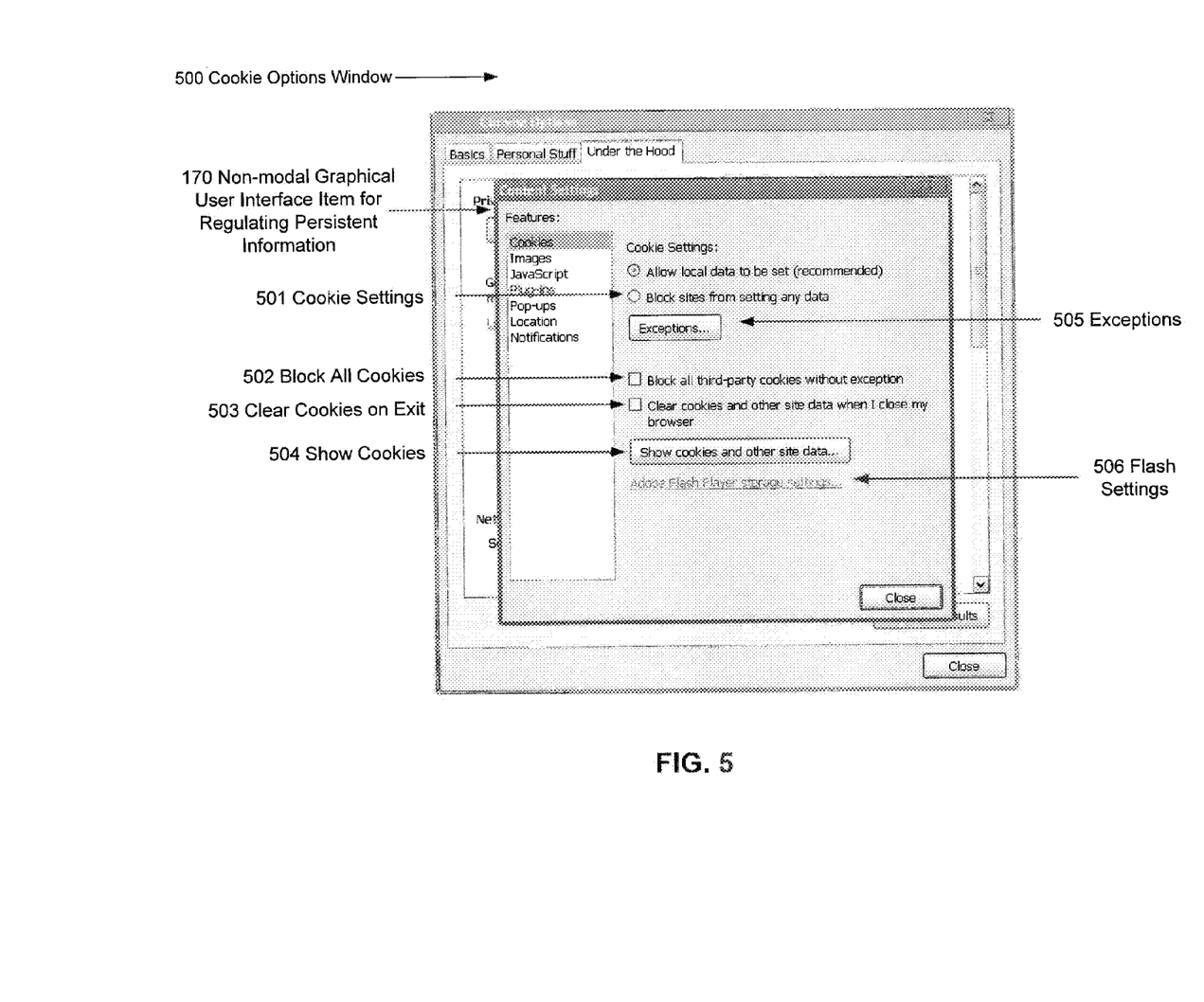
FIG. 5 is a screenshot of a graphical user interface control, according to an embodiment.

FIG. 5 is a screenshot of a graphical user interface control that allows a user 175 to set high-level settings for cookies, which are a type of persistent information, according to an embodiment. Specifically, embodiments may display a cookie options window 500 in a Web browser 131. Web browser 131 displays a non-modal graphical user interface item 170 for regulating persistent information. In the example of FIG. 5, the non-modal graphical user interface item is a non-modal dialog box 170. Non-modal dialog box 170 includes several sub-controls to receive input from a user 175.

In an embodiment, interface item 170 includes radio buttons with cookie settings 501. In the example of FIG. 5, this allows the user 175 with a choice between "Allow local data to be set (recommended)" and "Block sites from setting any data". A checkbox 502 may be used to "Block all third-party cookies without exception". A checkbox 503 may be used to "clear cookies and other site data when I close my browser", which prevents cookies from persisting from session to session. Finally, exemplary interface item 170 includes an icon 504 that may be selected to show cookies ("Show cookies and other site data . . . "). Icon 504 may lead to a non-modal rules setting interface item component that is detailed in FIG. 6, as well as an icon 505 for "Exceptions . . . ". Icon 505 may lead to the Cookie Exceptions window of FIG. 7. In exemplary item 170, a choice for "ADOBE FLASH Player storage settings . . . " 506 is provided, and embodiments may include functionality for controlling storage settings for ADOBE FLASH Player.

In order to carry out the commands entered in the non-modal graphical user interface item 170 for regulating persistent information, Web browser 131 loads Web pages with associated persistent information. In embodiments described herein, the websites are initially loaded with a subset of persistent information. A user can then easily reload the Web pages after entering settings that provide for selectively loading certain pieces of persistent information, using, for example, retrieving module 192 and redisplaying module 193.

Figure 6:
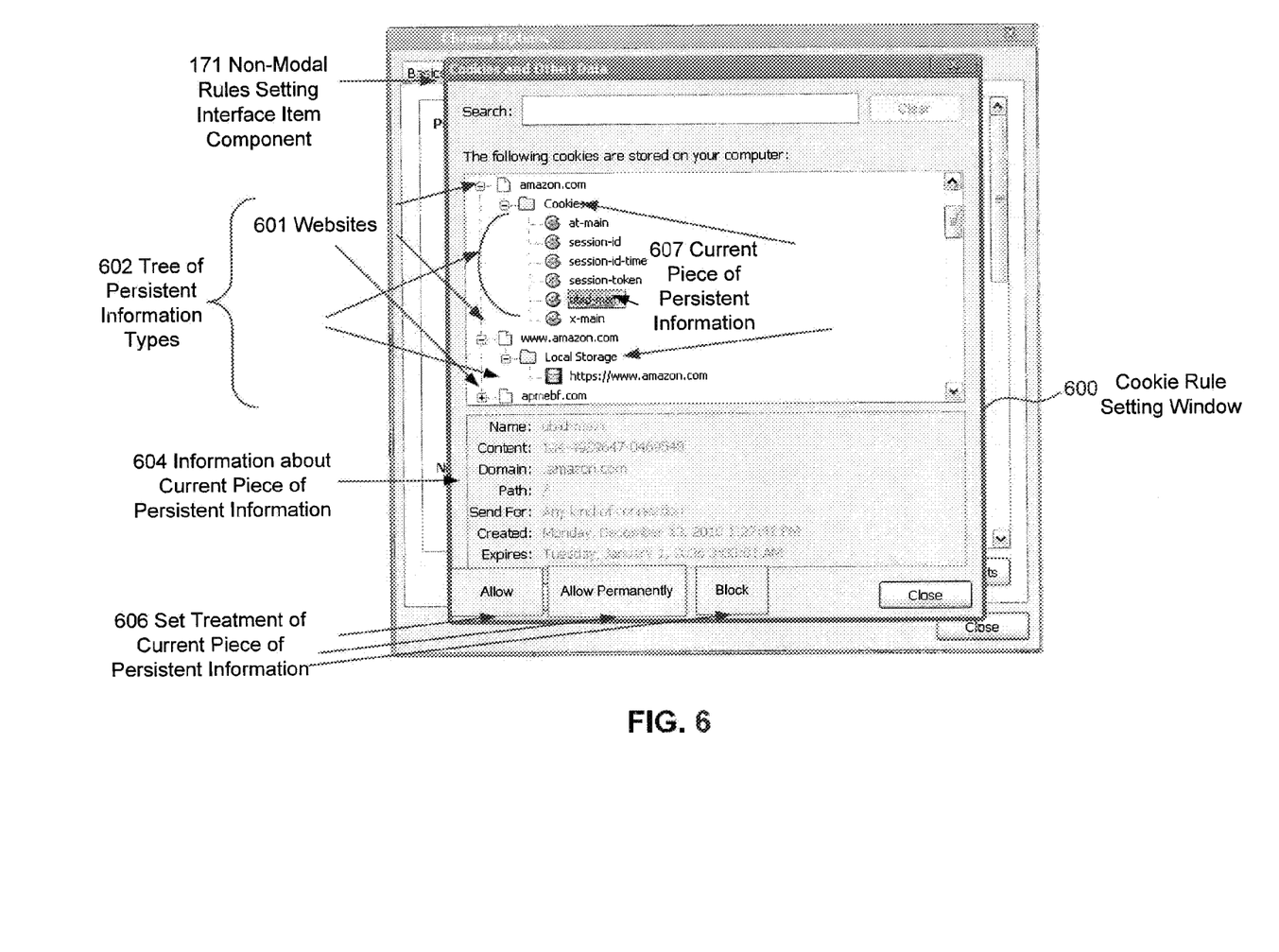
FIG. 6 is a screenshot of another graphical user interface control, according to an embodiment.

FIG. 6 is a screenshot of a graphical user interface control and cookie rule setting window 600 that allows a user 175 to exercise detailed control over the loading of cookies and other pieces of persistent information, according to an embodiment. Window 600 includes a non-modal rules setting interface item component 171, and allows the user 175 to individually manage pieces of persistent information and their treatment. Window 600 lists websites 601, displays a tree 602 of persistent information types, information 604 about a current piece of persistent information, and buttons for "allow", "allow permanently", and "block", that collectively allow the user 175 to set treatment for the current piece of persistent information 606. By navigating the non-modal rules setting interface item component 171, the user 175 can change which pieces of persistent information are retrieved along with the webpages. When the non-modal rules setting interface item component 171 is closed out, the retrieving module 192 and redisplaying module 193 work together to redisplay the webpages with which the user 175 has associated persistent information.

Figure 7:
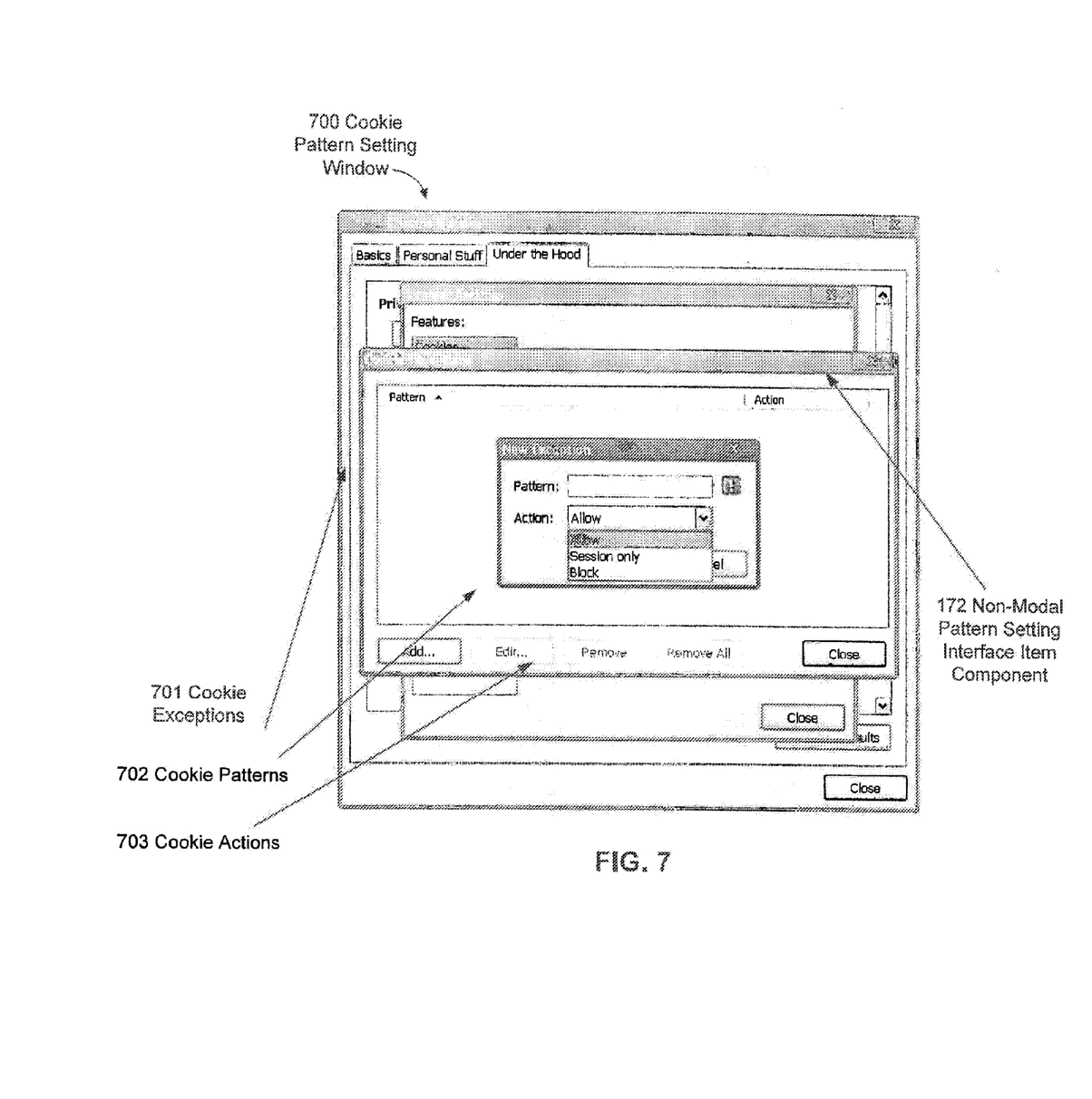
FIG. 7 is a screenshot of another graphical user interface control, according to an embodiment.

FIG. 7 is a screenshot of a graphical user interface control and cookie pattern setting window 700 that allows a user 175 to set patterns of cookies and manage responses to cookies that match those patterns using a non-modal pattern setting interface item 172, according to an embodiment. Window 700 includes a window that allows the user 175 to set cookie exceptions 701 by entering cookie patterns 702 and cookie actions 703. For example, the user 175 might enter "session*" and set "session only", so that all cookies that began with the phrase "session" would be set for the present session.

Embodiments provide additional functionality by managing cookies and other persistent information, as well as any appropriate equivalents. Embodiments offer control over the usage of cookies and other persistent information in displaying a Web page so as to protect the user's privacy and security, while maximizing browser flexibility and user friendliness. Speed is also increased because cookies are not automatically loaded. Thus, the user gains power and flexibility with respect to cookie management, and this approach facilitates using the cookies the user needs without halting browsing every time a cookie might be required or exposing security holes in the embodiments.

The Summary and Abstract sections may set forth one or more but not all exemplary embodiments of the present invention as contemplated by the inventor(s), and thus are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teachings and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for managing persistent information in a Web browser, comprising:
   one or more processors;
   a memory coupled to the one or more processors;
   a Web browser that receives website content via a network connection and displays the website content as one or more websites in one or more viewing areas, without loading all persistent information associated with the websites, wherein the web sites are loaded with a subset of persistent information;
   a non-modal graphical user interface control, activated using the Web browser, that displays a set of one or more persistent information items available via the network connection that, when associated with at least one of the one or more websites, aid in the displaying of the at least one website;
   an input module that receives from a user, via the non-modal graphical user interface control, a selection of one or more pieces of the persistent information to retrieve via the network connection, wherein the input module is implemented on the one or more processors;
   a retrieving module that receives the selected one or more pieces of persistent information via the network connection to the Web browser; and a redisplaying module that associates the selected one or more pieces of persistent information in the Web browser with the at least one website and uses the selected associated one or more pieces of persistent information to display the at least one website again.

2. The system of claim 1, wherein the pieces of persistent information are of one or more of: Hypertext Transfer Protocol cookies, Document Object Model storage, protocol preferences, information from Web databases, data in local storage, AppCache, Hypertext Markup Language 5 persistent information, Filewriter API information, or information from indexed databases.

3. The system of claim 1, wherein the retrieving module runs scripting commands to associate the selected pieces of persistent information with the websites and the associating of the selected pieces of persistent information does not block the execution of other scripting commands at the Web browser.

4. The system of claim 1, wherein the Web browser allows the user to browse websites displayed in the Web browser while the non-modal graphical user interface control remains active in the background.

5. The system of claim 1, wherein the user input to the non-modal graphical user interface control specifies, for one or more Web domains, which storage of persistent information is to be allowed for the current browsing session, allowed permanently, or blocked.

6. The system of claim 5, wherein the Web browser comprises a permanent storage that stores the selected persistent information that is to be allowed permanently.

7. The system of claim 1, wherein the non-modal user interface control provides to the user a list of sites whose access to persistent information is controlled, along with a list of specific pieces of the persistent information and access to information about the specific pieces of persistent information.

8. The system of claim 1, wherein the non-modal graphical user interface control is activated after the Web browser displays the website content.

9. A computer-implemented method for managing persistent information in a Web browser, comprising the steps of:
    receiving website content by a Web browser via a network connection and displaying the website content as one or more websites in one or more viewing areas, without loading all persistent information associated with the websites, wherein the web sites are loaded with a subset of persistent information;
    activating, using the Web browser, a non-modal graphical user interface control that displays a set of one or more persistent information items available via the network connection that, when associated with at least one of the one or more websites, aid in the displaying of the at least one website;
    receiving from a user, via the non-modal graphical user interface control, a selection of one or more pieces of the persistent information from the available persistent information to retrieve via the network connection;
    associating the selected one or more pieces of persistent information in the Web browser with the at least one website; and
    using the selected associated one or more pieces of persistent information to display the at least one website again.

10. The computer-implemented method of claim 9, wherein the pieces of persistent information are of one or more types chosen from the list consisting of: Hypertext Transfer Protocol cookies, Document Object Model storage, protocol preferences, information from Web databases, data in local storage, AppCache, Hypertext Markup Language 5 persistent information, Filewriter API information, and information from indexed databases.

11. The computer-implemented method of claim 9, further comprising associating the selected pieces of persistent information with the websites in a manner that does not block the execution of other scripting commands at the Web browser.

12. The computer-implemented method of claim 9, wherein the Web browser allows the user to browse websites displayed in the Web browser while the non-modal graphical user interface control remains active in the background.

13. The computer-implemented method of claim 9, wherein the user input to the non-modal graphical user interface control specifies, for one or more Web domains, which storage of persistent information is to be allowed for the current browsing session, allowed permanently, or blocked.

14. The computer-implemented method of claim 13, further comprising storing the selected persistent information that is to be allowed permanently.

15. The computer-implemented method of claim 9, further comprising providing to the user a list of sites whose access to persistent information is controlled, along with a list of specific pieces of the persistent information and access to information about the specific pieces of persistent information.

16. A computer-readable storage device having computer-executable instructions stored thereon that, when executed by a processor, cause the processor to manage persistent information in a browser by executing steps comprising:
    receiving website content by a Web browser via a network connection and displaying the website content as one or more websites in one or more viewing areas, without loading all persistent information associated with the websites, wherein the web sites, are loaded with a subset of persistent information;
    activating, using the Web browser, a non-modal graphical user interface control that displays a set of one or more persistent information items available via the network connection that, when associated with at least one of the one or more websites, aid in the displaying of the at least one website;
    receiving from a user, via the non-modal graphical user interface control, a selection of one or more pieces of the persistent information from the available persistent information to retrieve via the network connection;
    associating the selected one or more pieces of persistent information in the Web browser with the at least one website; and
    using the selected associated one or more pieces of persistent information to display the at least one website again.

17. The computer-readable storage device of claim 16, wherein the pieces of persistent information are of one or more types chosen from the list consisting of: Hypertext Transfer Protocol cookies, Document Object Model storage, protocol preferences, information from Web databases, data in local storage, AppCache, Hypertext Markup Language 5 persistent information, Filewriter API information, and information from indexed databases.

18. The computer-readable storage device of claim 16, further comprising instructions that, when executed by a processor, cause the processor to associate the selected pieces of persistent information with the websites in a manner that does not block the execution of other scripting commands at the Web browser.

19. The computer-readable storage device of claim 16, wherein the Web browser allows the user to browse websites displayed in the Web browser while the non-modal graphical user interface control remains active in the background.

20. The computer-readable storage device of claim 16, wherein the user input to the non-modal graphical user interface control specifies, for one or more Web domains, which storage of persistent information is to be allowed for the current browsing session, allowed permanently, or blocked.

21. The computer-readable storage device of claim 20, further comprising instructions that, when executed by a processor, cause the processor to store the selected persistent information that is to be allowed permanently.

22. The computer-readable storage medium of claim 16, further comprising instructions that, when executed by a processor, cause the processor to provide to the user a list of sites whose access to persistent information is controlled, along with a list of specific pieces of the persistent information and access to information about the specific pieces of persistent information.

\* \* \* \* \*